United States Patent [19]

Champagne et al.

[11] 4,378,526

[45] Mar. 29, 1983

[54] PULSE CODE DEMODULATOR FOR FREQUENCY SHIFT KEYED DATA

[75] Inventors: Claude J. J. Champagne, Carleton Place; Ernst A. Munter, Kanata, both of Canada

[73] Assignee: Northern Telecom Limited, Montreal, Canada

[21] Appl. No.: 190,904

[22] Filed: Sep. 25, 1980

[51] Int. Cl.³ .............................................. H04L 27/14
[52] U.S. Cl. ...................................... 329/104; 375/82; 375/88; 340/825.58
[58] Field of Search ........................ 329/104, 106, 107; 375/80, 82, 88; 340/825.58

[56] References Cited

U.S. PATENT DOCUMENTS 3,908,169 9/1975 Tong ...................................... 375/82

Primary Examiner—Siegfried H. Grimm
Assistant Examiner—Edward P. Westin
Attorney, Agent, or Firm—John E. Mowle

[57] ABSTRACT

A demodulator which directly decodes Pulse Code Modulated Signals initially modulated by Frequency Shift Keyed Data by determining the period between zero crossings. The instant of the zero crossing between PCM signal samples is determined by interpolation from the magnitude of the samples immediately preceding and succeeding the zero crossing upon detection of a change in the sign bit of the PCM signal.

4 Claims, 1 Drawing Figure

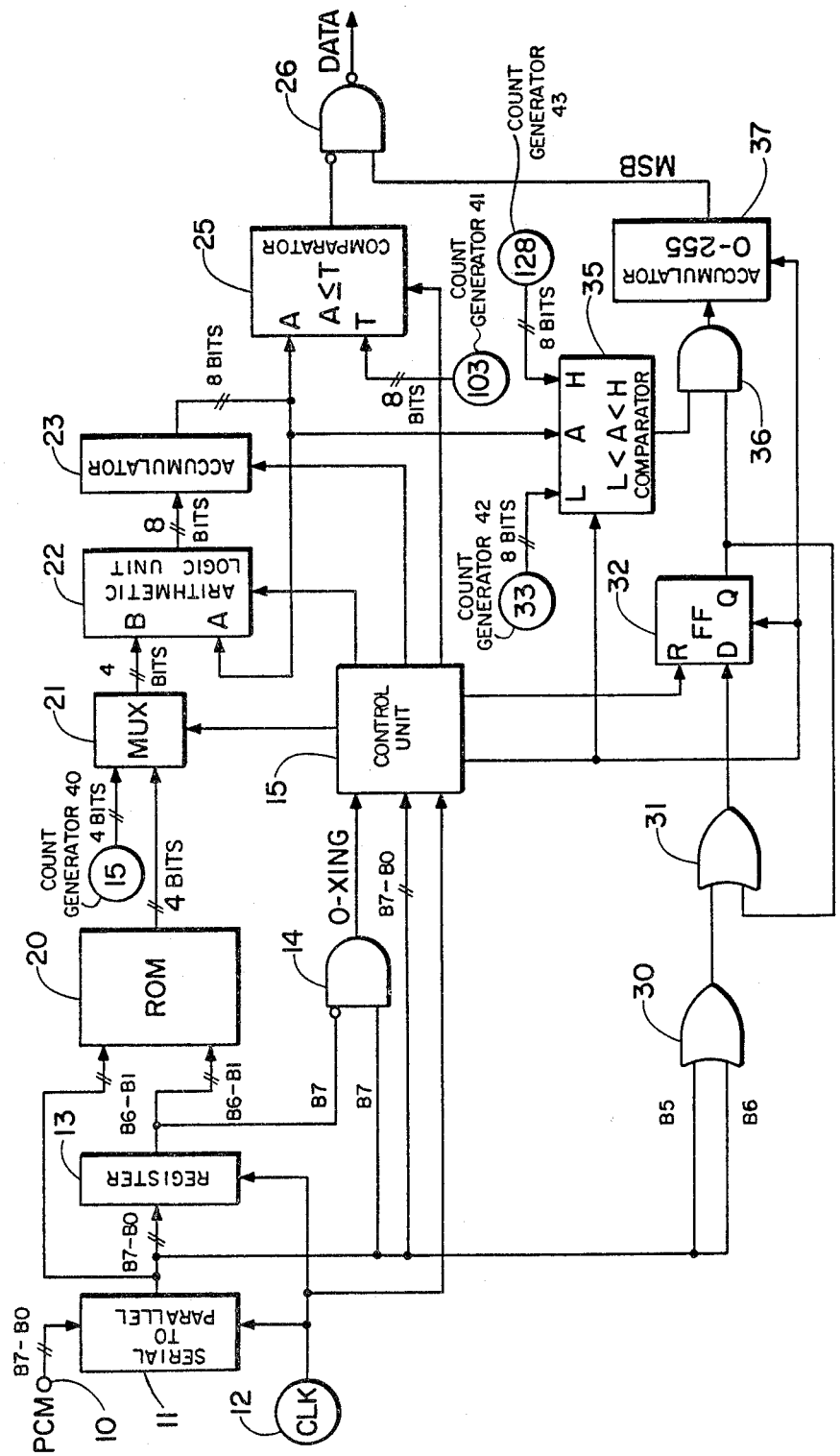

PULSE CODE DEMODULATOR FOR FREQUENCY SHIFT KEYED DATA

This invention relates to a circuit for decoding a pulse code modulated (PCM) signal and more particularly to one which directly decodes frequency shift keyed (FSK) data from a PCM signal.

BACKGROUND OF THE INVENTION

Frequency shift keying has been commonly utilized to transmit data at voice band frequencies over telephone lines. The voice band information in turn, may be transmitted as a PCM signal. Thus, a data signal will be initially modulated to an FSK signal and later further encoded into PCM.

While the data signal could be decoded in two stages (from PCM to FSK to data) it would be desirable to directly convert from PCM to data. Discrimination between the marks and spaces of a received PCM encoded FSK data signal might be done by digitally counting the number of digital samples between successive zero-crossings. However, to do so the minimum difference in the periods between the two FSK signals must be at least twice the sampling period of the PCM signal. A standard voiceband PCM signal is sampled at an 8 KHz rate and thus has a period of 0.125 msec. One FSK standard utilizes frequencies having a period of 0.934 msec. (1070 Hz) and 0.787 msec. (1270 Hz) so that the difference in their periods is 0.147 msec. To discriminate between these two frequencies the maximum sampling period of the PCM signal must be less than one-half this difference (i.e. 0.147/2=0.073 msec.) much less than the PCM standard of 0.125 msec. It will be evident therefore that a more precise determination of the zero-crossings must be made in order to directly determine the data from the PCM signal.

STATEMENT OF THE INVENTION

It has been discovered that a high resolution estimate of the zero-crossing instant of the PCM encoded FSK signal can be interpolated from a comparison of the magnitude of the PCM samples before and after each zero crossing. From this information, the true position of the zero crossing can be estimated with sufficient accuracy that direct recovery of the FSK data from the PCM samples can be achieved.

Thus, in accordance with the present invention there is provided a demodulator for directly decoding the frequency shift keyed data in a pulse code modulated signal. The demodulator comprises a means for detecting a change in the sign bit of the PCM signal. It also includes a means for generating an interpolated signal count based on the difference in the magnitude bits of samples of the PCM signal immediately preceding and succeeding the zero crossing of the frequency shift keyed data signal to indicate the relative position of that zero crossing with respect to the succeeding adjacent sample instance of the PCM signal. In addition, the modulator includes a control circuit responsive to detection of a first change in the sign bit for initializing the accumulator to the interpolated signal count, and responsive to detection of no change in the sign bit occurring between succeeding signal samples for adding the maximum value of the interpolated count to the accumulator, and also responsive to detection of the next change in the sign bit for adding the complement of the next interpolated signal count thereto (i.e. the difference between the maximum signal count and the next interpolated signal count) prior to again initializing the accumulator. The demodulator also comprises a means responsive to the instant count in the accumulator after detection of the next change in the sign bit, for generating a signal representing a mark or space when the count is respectively less than or greater than a selected value so as to directly decode the frequency shift keyed data.

In a particular embodiment, the demodulator additionally includes a comparison means for generating a comparison control signal when the instant count in the accumulator is greater than a selected minimum value and less than a selected maximum value. Also included is a means for generating a threshold control signal when the magnitude of at least one sample between adjacent changes in the sign bit exceeds a minimum value. The occurrence of these two signals in turn generates a gate control signal. A further accumulator means integrates the occurrences of the gate control signal from a minimum to a maximum value, and a means responsive to a selected minimum number of occurrences stored in the accumulator is utilized to gate the decoded frequency keyed data to the output of the demodulator.

BRIEF DESCRIPTION OF THE DRAWINGS

An example embodiment of the invention will now be described with reference to the accompanying drawing in which the single FIGURE is a block schematic diagram of a demodulator in accordance with the present invention.

DESCRIPTION OF THE PREFERRED EMBODIMENT

In the following description which refers to the single FIGURE, the detailed structure of the demodulator will be evident from the accompanying description of its function and operation. While only single channel operation is described, it will be evident that the circuit could be readily modified by the addition of storage registers to demodulate multi-channel signals on a time shared basis. It is well known that PCM signals can be manipulated in serial or parallel form. The standard PCM voice band signal is sampled at an 8 KHz rate, each of which consists of 8 bits identified as follows:

B7 = sign bit;
B6 = most significant magnitude bit;
B5 = next most significant magnitude bit;—and
B0 = least significant magnitude bit.

In the following description, the relevant bit numbers or the number of bits being manipulated will be indicated adjacent a double bar on each signal path.

Referring to the single FIGURE, an 8 bit serial PCM signal (having bit number designations B7–B0) is connected from an input 10 to a serial-to-parallel converter 11 driven by a 64 KHz clock 12 (assuming single channel operation). The PCM signal is encoded from FSK data having standard frequencies of 1270 Hz (mark) and 1070 Hz (space) at a 300 baud rate. The 8 bits are then coupled in parallel through a one frame delay register 13. The sign bit B7 from the converter 11 is connected together with the inverted and delayed sign bit from the register 13, to an AND gate 14 in order to detect a change in the sign bit indicating a positive-going zero crossing of the encoded FSK signal at its output. Both the zero crossing signal and the clock are connected to the input of a sequence timing control 15. The six most significant magnitude bits B6–B1 from the converter 11 and the register 13 are connected to an interpolation read-only-memory (ROM) 20 which generates at its output a 4 bit digital signal based on the equivalent linear values of the magnitude of the sample succeeding the zero crossing divided by the sum of the succeeding sample and the one preceding it (i.e. the one immediately preceding the zero crossing). This indicates the relevent position of the zero crossing with respect to the succeeding sampling instant of the pulse code modulated signal. While sinusoidal interpolation might be used in specific applications, straight line or linear interpolation was found to give better results when the incoming signal was unknown. Both this signal from a count generator 40, and a 4 bit binary signal equivalent to the maximum count of 15 from the ROM 20, are connected to a multiplexer 21. When a zero crossing is detected, the sequence timing control 15 connects the output from the ROM 20 through the multiplexer 21 to the B input of an arithmetic logic unit 22. Conversely, when no zero crossing is detected, the 4 bit binary signal (from the generator 40) equivalent to a maximum count of 15, is connected to the B input of the arithmetic logic unit 22.

When an initial zero-crossing is detected during a PCM signal sample, the complement of the digital signal on the B input of the arithmetic logic unit 22 is added to that which is present at its A input (i.e. the current sum in the accumulator 23). The accumulator 23 is then updated with this new sum which is transferred through an 8 bit line under control of the control unit 15. After this sum is processed, (as described below) the accumulator 23 is immediately initialized for the next calculation, with the same digital signal (i.e. not its complement) on the B input of the arithmetic logic unit 22. Thereafter, when each PCM signal sample occurs with no detection of a change in the sign bit, the maximum count of 15 at the B input is added to the current number in the accumulator 23 which is present at the A input of the arithmetic logic unit 22. The accumulator 23 is then updated with this new total. This continues until the next change in the sign bit is detected whereupon the logic unit 22 adds the complement of the next following interpolated signal count from the output of the ROM 20, so that the difference between the maximum count of 15 and the next following interpolated signal count, is added to and then stored in the accumulator 23. The sum stored in the accumulator 23 is then processed by a comparator 25, under control of the timing control 15. The comparator 25 compares the 8 bit summed output of the accumulator 23 at its A input against an 8 bit binary number of 103 from a count generator 41 at its threshold input T. After processing, the accumulator 23 is again initialized for the next calculation.

With an interpolation range of 15 and a PCM sampling rate of 8 KHz, the effective sampling rate is $15 \times 8$ KHz=120 KHz. When an FSK signal of 1070 Hz is being transmitted, the total count in the accumulator at the end of one period will be about 120,000/1070=112, whereas when an FSK signal of 1270 Hz is being transmitted, the total count in the accumulator will be about 120,000/1270=94. The average of these two is then 103 which is the reference number from binary generator 41, utilized in the comparator 25. Hence, if the comparison indicates the number at its A input is equal to or less than 103, a logic 1 indicating a mark is coupled to the inverted input of NAND gate 26. Conversely, if the number is greater than 103, a logic 0 indicating a space is connected to this input.

The following is an illustrative example of a typical sum which would be accumulated in the accumulator 23 for a sequence of 8-Bit PCM signals at the input 10, commencing and ending with "initial" and "final" samples respectively. These two samples occur immediately after successive zero crossings, and have "intermediate" samples therebetween. In this example an "X" indicates the signal is not utilized and hence its magnitude is of no consequence.

| Signals at Input 10 | Signal from ROM 20 | Complement of Signal from ROM 20 | Signal from Generator 40 |
|---|---|---|---|
| Initial Sample | 12 | (15 − 12) = 3 | X |
| 6 Intermediate Samples | X | X | 15 |
| Final Sample | 5 | (15 − 5) = 10 | X |

The accumulated sum from initialization to just before processing will be:

$$12+15+15+15+15+15+15+10=112.$$

This is the sum of the signal from the ROM 20 resulting from the "initial" sample, the signals from the generator 40 resulting from the six "intermediate" samples, and the complement of the signal from the ROM 20 resulting from the "final" sample. It is this sum which is processed by the comparator 25 and in the present example indicates an FSK signal of 1070 Hz. Immediately thereafter, the accumulator 23 is initialized to the current value (i.e. 5) of the signal from the ROM 20 resulting from the "final" sample to begin the next summation.

Additional signal level and carrier frequency checks are also made before acceptance of the demodulated data signal from the NAND gate 26. The signal level is checked by determining the presence of either of the two most significant magnitude bits B6 or B5 from the output of the converter 11 to indicate whether a signal reference level of −30 DBM has been reached. Whenever the incoming binary signal has a magnitude greater than the reference level, an output from OR gate 30 is connected through an OR gate 31 to set a D flip-flop 32. The flip-flop 32 in turn is held in a latched condition by a return signal from its Q output coupled through the OR gate 31 until reset by the sequence counting control 15 after detection of a zero crossing.

To determine that the detected carrier frequency is within range, the 8 bit output of the accumulator 23 is also connected to the A input of comparator 35. Low and high binary reference signals from binary generators 42 and 43, representing a count of 33 and 128 respectively, are also connected to the comparator 35 so that an output will be obtained only when the count from the accumulator is between these two numbers. With 120 KHz sampling, these counts of 33 and 128 represent a frequency range from 3610 to 945 Hz respectively.

When the incoming PCM signal is within magnitude and frequency limits, the two outputs from the flip-flop 32 and the comparator 35 produce an output from AND gate 36 which is connected to an accumulator 37 having minimum and maximum limits of 0 and 255. When the accumulator reaches a count of 128, an output is obtained on the most significant bit stage which then opens the NAND gate 26 to couple the demodulated data to the output of the demodulator.

What is claimed is:

1. A demodulator for directly decoding frequency shift keyed data in a pulse code modulated signal having magnitude bits and a sign bit, comprising:

means for detecting a change in the sign bit;

means for generating an interpolated signal count based on the values represented by the magnitude bits of samples of the pulse code modulated signal immediately preceding and succeeding the zero crossing of the frequency shift keyed data signal to indicate its position relative to the succeeding sampling instant of the pulse code modulated signal;

an accumulator;

means responsive to the detection of an initial change in the sign bit for initializing the accumulator to the interpolated signal count, and responsive to the detection of no change in the sign bit occurring between succeeding signal samples for adding the maximum value of the interpolated count to the accumulator, and responsive to the next change in the sign bit for adding the complement of the next interpolated signal count to the accumulator;

means responsive to the instant count in the accumulator after detection of said next change in the sign bit, for generating a mark or a space when said count is less than or greater than a selected value so as to directly decode the frequency shift keyed data.

2. A demodulator as defined in claim 1 in which the interpolated signal count is linearly proportional to the equivalent linear values of the magnitude of the succeeding sample, divided by the sum of the magnitudes of the preceding and succeeding samples.

3. A demodulator as defined in claim 1 in which the detection of the change in the sign bit is always in the same direction.

4. A demodulator as defined in claim 3 which additionally comprises:

comparison means for generating a comparison control signal when said instant count in the accumulator is greater than a selected minimum value and less than a selected maximum value;

means for generating a threshold control signal when the magnitude of at least one sample between adjacent changes in the sign bit exceeds a selected minimum value; and means for generating a gated control signal when the comparison and threshold signals occur concurrently; and a further accumulator for integrating the occurrences of the gated control signal from a minimum to a maximum value; and means responsive to a selected minimum number of occurrences stored in the further accumulator for gating the decoded frequency shift keyed data to the output of the demodulator.

* * * * *